UNITED STATES PATENT OFFICE.

AUGUSTE P. DUBRUNFAUT, OF PARIS, FRANCE.

PURIFICATION OF SIRUPS AND MOLASSES IN THE MANUFACTURE OF SUGAR FROM BEET-ROOT AND CANE.

SPECIFICATION forming part of Letters Patent No. 237,835, dated February 15, 1881.

Application filed January 5, 1881. (No specimens.) Patented in France March 30, 1880.

*To all whom it may concern:*

Be it known that I, AUGUSTE PIERRE DUBRUNFAUT, of Paris, in the Republic of France, have invented a certain new and useful Improvement in Purification of Sirups or Molasses in the Manufacture of Sugar from Beet-Root and Cane, of which improvement the following specification is a full description.

It has been found that the impure sirups or juices of beet-root heated or boiled with lime are subject to changes, giving rise to the formation of salts of lime. These salts come from two sources—namely, first from the reaction of the alkaline earth on the organic matter of the sirups; and, second, from a similar reaction upon the organic salts. In both cases soluble or insoluble salts of lime are formed. It has also been observed that in carrying out the system of purification by means of lime and carbonic acid, termed the "calco-carbonic process," the soluble salts of organic acids (that is, salts on which there is no osmose action) are eliminated, at least partially in a single operation. It has furthermore been observed that the osmose process applied at raised temperatures to sirups rendered strongly alkaline with lime, completes the transformation produced by the boiling with lime, so that this mode of operating realizes with the greatest perfection the purification by osmose, which eliminates the mineral salts with exclusion of the sugar, at the same time that it generates in the sirups the greatest proportion of the calcic salts, which it is the object of the calco-carbonic purification (which should follow this process) to eliminate. These diverse processes, more or less known and badly carried out at present, can, by being co-ordinated systematically, furnish all the elements necessary for the solution, at least partial, of a problem often proposed but never solved—namely, the manufacture of beet-sugar without residue of molasses. These processes carried out, as will now be described, have the great advantage of being exceedingly simple and easily applied in all kinds of factories, large or small, and to all systems of manufacture.

In most of the applications only a slight additional outlay, either for plant or cost of manufacture, is required.

In specifying the various modes of application, the simplest mode, and that most generally used, will be first considered.

*Rasping and pressing process.*—In order to apply the invention to this process the usual normal process of defecation (which is in reality only an imperfect carrying out of the calco-carbonic process) is carried on for some days. In this case it is useful to render slightly alkaline with lime the waters thrown on the rasp, or those which serve for the second pressing when mechanical presses are used. The lime used in this case has for its object to transform the pectine of the pulp, or pectate, and the albumen into insoluble compounds. The liquor obtained in this way, maintained slightly alkaline, and either filtered or not through granular animal-charcoal, are boiled, crystallized, and subjected to centrifugal action, as usual. After some days of operating—that is to say, as soon as by the centrifugal action on the primary sugars the discharge-liquor therefrom has been rendered available—the processes which constitute the present improvements begins. The discharged sirup mixed moderately with milk of lime is heated to a temperature which may vary from 60° to 100° centigrade, according to the requirements of the process. It is then subjected to the hot osmose process. In most cases it is sufficient to produce a moderate osmose action—that is to say, to reduce the density of the sirup to 25° Baumé. This simple operation produces at once the useful effect of boiling with lime, and this effect, which is continued during the entire duration of the osmose action, shows its intensity and utility by the alkaline character which it imparts to the liquor of exosmose. This character is due entirely to the soluble caustic alkalies (potassa and soda) derived from the organic salts of the sirups. The product of the treatment by osmose, or "osmosised sirup," as it may be called, which comes out at a temperature of from 50° to 80° centigrade, is mixed with the cold juices from the presser. These juices reduce the temperature to 30° or 35° centigrade at the same time that they raise the density of the juices from 10° to 12° Baumé. These conditions of temperatue and density are the most perfect for usefully carrying out the calco-carbonic process. This mixture of the two liquors is saturated with lime and introduced into the boiler for defecation. In this boiler it is methodically subjected to gaseous action, the following being the best mode of operation: The sirup is subjected to the gaseous action in a cold state, (at about 25° to 30° centigrade,) employing the usual precautions for preventing frothing, and the operation is stopped when the sirup shows a decided tendency to thicken without attaining an actual solid consistency. This point is important in the operation, because upon it depends the greater or less elimination of the organic calcic salts—that is to say, the degree of purification effected by the calco-carbonic process. This purification is the only useful object of the defecation by agitation as ordinarily carried out. In this ordinary process, however, the phenomenon of thickening, which requires a density of at least 10° to 12° Baumé, can never be obtained, and the purifying effect of the process is very variable and uncertain in different manufactories. It can be practically ascertained when the sirup under treatment with carbonic-acid gas approaches the thickening stage by its opaque or cloudy appearance; or it may be still better determined by heating small samples to 100° centigrade, when, if the sirup is at the desired point of density, it will solidify. If this operation is well carried out it should effect the elimination of at least one-half to two-thirds of the salts of lime by one operation. The quantity eliminated is readily ascertained by means of the hydrometer. When the above treatment has been brought to the desired point, ascertained by the means above indicated, the supply of gas is stopped and the mass is heated to the boiling-point—100° centigrade. This operation clarifies the sirup, which, when allowed to settle, gives an abundant heavy deposit, readily separated by filtering-presses. The sirup, which is very alkaline, is decanted and placed in the boiler for double carbonization, where it is saturated with carbonic-acid gas while hot. If this process is efficiently carried out the saturated sirup remains somewhat alkaline, is colorless, and is suitable for filtering through charcoal and boiling for granulation. From this time forward the liquor resulting from the centrifugal action on the sugar of first extraction may be continually brought under operation so long as the boiling for granulation and the quality of the sugar of first extraction do not disclose any alteration or any change in the composition of the sirup. If after a certain time—say, from one to three weeks, according to the quality of the roots—the quality of the discharged sirup should change, disclosing a sensible diminution of the saline coefficient, the sirup must be removed, in order to work it separately as inferior product, and a fresh series of operations must be commenced with discharge-sirup purified by calcic-osmose action in connection with lime. By such operations, as above described, the quantity of molasses will be considerably reduced. The liquors of exosmose, having at most the saline coefficient 1, could be discharged to waste without much inconvenience where no means are provided for utilizing them; but it is obvious that these liquors, in view of the nature of their saline constitution, will always be capable of advantageous reconstitution into molasses, either to be distilled or to be worked up in the normal molasses or salts processes.

*Process of diffusion.*—This process, which is becoming general in sugar-mills, offers no obstacle to the adoption of the present invention, but, on the contrary, secures the more complete exhaustion of the residues and results in a greater yield of molasses. There is, on this account, a greater need for the application of such a process, since it is designed principally for the purification of molasses or sirup. The process will require but slight changes in applying the invention thereto. The calcic discharge-liquors osmosised, nearly pure and hot or even boiling, may with advantage be put, together with the beet-root cut in slices or pieces, in a suitable vessel or vessels, in order to raise their temperature to that which is useful for diffusion, and this operation may with advantage be effected in the diffusers themselves. Under these conditions, besides the heating of the roots and the cooling of the sirup, an exchange by osmotic will be effected between the two products—that is to say, the sirup will become richer in sugar and poorer in salts at the same time that it becomes diluted, while the roots will be affected in the opposite manner. When the circulation of the sirup over the roots shall have reduced its density to from 10° to 12° Baumé, and when, at the same time, the temperature shall have been reduced to from 20° to 25° centigrade, it is removed for treatment by the defecating process. The roots, the juice of which has been diffused with the discharge-sirup, are exhausted by the ordinary processes—that is to say, by means of water. The sirup at the head of the diffusers having attained the maximum density of 10° to 12° Baumé and a temperature of 30° to 40° centigrade, are saturated with lime in order to be subjected to the calco-carbonic purification, precisely in the same manner as described with reference to the rasping and pressing process. The roots, after this operation is completed, retain the pectic products in the form of pectates and the albuminous products, as their contact with their discharge-sirup facilitates the reactions that produce this result.

*Operation with molasses and sirup.*—All products to which the osmotic purification is applied are susceptible of treatment in accordance with this invention, provided they do not contain large proportions of glucose. These sirups having been subjected to the action of lime in the heating-boiler, as previously described for the discharge-liquor from the first extraction, may be subjected successfully to the hot calcic osmose action and the useful effects described in transforming the diverse impurities into calcic salts are produced. In the case under consideration—that is to say, with products (molasses and sirup) much more impure than the discharge from the first extraction—the osmose action should be thorough, so that the liquor reaches a density of from 10° to 12° Baumé.

To prevent the inconveniences of too hot a calcic osmose action cold or lukewarm water may be used, so that the osmose action may be effected at temperatures of from 50° to 70° centigrade.

The osmosised sirups are cooled by any known means to from 35° to 40° centigrade, are saturated with lime, and are subjected to the calco-carbonic purification as previously described. Good molasses subjected to this purifying process (which might, if necessary, be repeated, as calco-carbonic treatment with feeble osmose action, followed by filtration on a thick layer of granular charcoal) will, without fail, be ready to undergo the process of boiling for granulation. It is to be observed that this mode of operating destroys the compound of sugar and alkali, which has been found to be the main cause of the double saccharimetric character of the calcic sirups and molasses. This effect is produced by the elimination, by means of hot calcic osmose action, of the caustic alkali, which characterizes the uncrystallizable sugar having the double character, and the uncrystallizable sugar in regaining its normal constitution at the same time becomes crystallizable, which constitutes a new and important advantage in purification, due entirely to the hot calcic osmose action.

It has also been found, by experiment, that this process is applicable to all products containing more or less glucose derived from beet or from sugar-cane, either at the sugar-mills or the refineries.

It has been considered necessary to except those products of this kind that contain large quantities of glucose, as in treating these in the hot state with lime a glucate of lime is formed as the initial product of the reaction, which salt is soluble and indiffusible, and resists the method of calco-carbonic purification.

It has been observed that when the alkaline reaction is prolonged so as to transfer all the glucose into apoglucic acid, and consequently into apoglucate of lime, this salt undergoes complete elimination by the calco-carbonic purification. Consequently all sirups and molasses of beet-root subjected to the new processes undergo the purification above mentioned and lead to the preparation of sirups with these products purified to such a degree that they can be subjected to the process of boiling for granulation and yield white sugars differing little in quality from the sugars of first extraction. It will be readily understood that under these conditions the new processes are also applicable in refineries even where sugar-cane is operated upon, as also in sugar-mills operating with sugar-cane.

The glucosic products require an addition of lime, such as will transform into apoglucate the glucose combined with the products to be operated upon. Caustic soda and potash, in effecting the transformation in question more rapidly, can be utilized for the products of a very glucosic nature, such as those of sugar-mills and refineries for cane-sugar. The high coloring produced in sirups by this transformation does not matter, as these products transformed into salts of lime by the calcic osmose action being eliminated by the calco-carbonic purification give sirups of only slight coloration, on which animal-charcoal has a considerable action. Thus, where large quantities of animal-charcoal are employed for decolorizing, the use of the new processes will reduce this quantity to a minimum.

Having now fully described the said invention and the manner of carrying the same into effect, what I claim is—

The described method of purifying the juices, sirups, and molasses of beet-root and sugar-cane, characterized by the subjecting of the liquor in a heated condition with lime to the action of osmose in connection with the calco-carbonic treatment, or treatment with lime and carbonic acid, substantially as set forth.

In witness whereof I have hereunto signed my name in the presence of two subscribing witnesses.

A. P. DUBRUNFAUT.

Witnesses:
JULES ARMENGAUD,
ROBT. M. HOOPER.